US012525746B2

(12) United States Patent
Wallensteiner et al.

(10) Patent No.: US 12,525,746 B2
(45) Date of Patent: Jan. 13, 2026

(54) PLUG CONNECTOR AND PLUG CONNECTOR ASSEMBLY

(71) Applicant: Robert Bosch GmbH, Stuttgart (DE)

(72) Inventors: Georg Wallensteiner, Gemmrigheim (DE); Viet Nguyen Tan, Ho Chi Minh (VN); Robert Torno, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 517 days.

(21) Appl. No.: 17/915,622

(22) PCT Filed: Mar. 22, 2021

(86) PCT No.: PCT/EP2021/057229

§ 371 (c)(1),
(2) Date: Oct. 25, 2022

(87) PCT Pub. No.: WO2021/197881

PCT Pub. Date: Oct. 7, 2021

(65) Prior Publication Data

US 2023/0155325 A1 May 18, 2023

(30) Foreign Application Priority Data

Mar. 30, 2020 (DE) ..................... 10 2020 204 060.5

(51) Int. Cl.

| | |
|---|---|
| ***H01R 13/641*** | (2006.01) |
| ***H01R 13/629*** | (2006.01) |
| *H01R 13/52* | (2006.01) |

(52) U.S. Cl.

CPC ..... *H01R 13/641* (2013.01); *H01R 13/62955* (2013.01); *H01R 13/5213* (2013.01); *H01R 2201/26* (2013.01)

(58) Field of Classification Search
None
See application file for complete search history.

(56) References Cited

U.S. PATENT DOCUMENTS

| | | | | |
|---|---|---|---|---|
| 7,361,036 B2 * | 4/2008 | Pittenger | H01R 13/62955 | 439/157 |
| 8,784,127 B2 * | 7/2014 | Bashkin | H01R 13/62955 | 439/372 |

(Continued)

FOREIGN PATENT DOCUMENTS

| | | | | |
|---|---|---|---|---|
| CN | 101427424 A * | 5/2009 | H01R 13/62955 |
| DE | 102015222124 A1 | 5/2017 | |
| FR | 3078447 A1 * | 8/2019 | H01R 13/62955 |

OTHER PUBLICATIONS

International Search Report for PCT/EP2021/057229, Issued Jun. 11, 2021.

*Primary Examiner* — Tho D Ta
(74) *Attorney, Agent, or Firm* — NORTON ROSE FULBRIGHT US LLP

(57) ABSTRACT

A plug connector for interlocking with a mating plug connector along an insertion direction. The plug connector includes: a plug connector housing configured to accommodate at least one contact element; a lever assembly swivelable between a first position and a second position; a cover; and a CPA including at least one blocking element. In the second position, the lever assembly is releasably latched to a latching structure. The CPA is situated at the cover, and is displaceable between an unblocking position and a blocking position along a displacement direction. The CPA includes a blocking element which in the blocking position of the CPA prevents a displacement of the latching structure for releasing the latch between the lever assembly and the latching structure.

8 Claims, 12 Drawing Sheets

(56) References Cited

U.S. PATENT DOCUMENTS

| | | | | |
|---|---|---|---|---|
| 9,281,614 | B1 | 3/2016 | Bonucci et al. | |
| 10,490,938 | B2 * | 11/2019 | Probert | H01R 13/62938 |
| 2004/0192090 | A1 | 9/2004 | Flowers et al. | |
| 2006/0089031 | A1 * | 4/2006 | Flowers | H01R 13/5812 439/157 |
| 2006/0211286 | A1 | 9/2006 | Shuey | |
| 2007/0197081 | A1 | 8/2007 | Patterson et al. | |
| 2015/0295352 | A1 | 10/2015 | Kim et al. | |
| 2017/0229813 | A1 * | 8/2017 | Exenberger | H01R 13/62977 |
| 2018/0301850 | A1 | 10/2018 | Hirota | |
| 2019/0123484 | A1 | 4/2019 | Probert et al. | |

* cited by examiner

PLUG CONNECTOR AND PLUG CONNECTOR ASSEMBLY

FIELD

The present invention relates to a plug connector, and a plug connector assembly that includes such a plug connector.

BACKGROUND INFORMATION

Electrical plug connectors for interlocking with a mating plug connector are available in the related art, for example in automotive applications, the plug connector including a plug connector housing for accommodating a plurality of contact elements, and a cover. To reduce the operating force, in addition a lever assembly for reducing an operating force when joining and/or separating the plug connector to/from the mating plug connector is often provided, the lever assembly being swivelable between a first (unlocked or open) position and a second (locked or closed) position. In the second position, i.e., when the plug connection between the plug connector and the mating plug connector is closed, the lever assembly may be releasably latched to a latching structure, for example an elastically reversibly displaceable detent lug, to prevent inadvertent opening of the plug connection. A combination of a plug connector and a mating plug connector may be referred to as a plug connector assembly.

This type of plug connector and a plug connector assembly are described in German Patent Application No. DE 10 2015 222 124 A1.

SUMMARY

The present invention is based on the finding that under difficult installation conditions, for example, it is not always possible for an installer to visually discern or haptically feel when, or whether, the plug connection is completely closed. In addition, in principle it is also possible that, although the latch of the lever assembly has initially taken place in the second position at the latching structure, the latching structure may be inadvertently released, so that an unintended displacement of the lever assembly in the direction of the first position may take place. This may result in undesirable detachment of the plug connection and of the electrical contact between contact elements and countercontact elements.

Therefore, there may be a need to provide a plug connector for which, even under difficult installation situations, an installer may clearly recognize, for example via haptic feedback, when, or whether, the plug connection is correctly or completely closed. At the same time, there may be a need to further secure the lever assembly from inadvertent unlocking or unlatching (with the aid of a latching structure, for example) in the second position, in which the plug connection is closed. In addition, it is to be ensured that an element which may provide such haptic feedback or which represents protection from inadvertent unlatching is not or cannot be unintentionally activated even before the plug connection is closed.

This need may be met by the features of the present invention. Advantageous specific example embodiments of the present invention are disclosed herein.

According to a first aspect of the present invention, a plug connector for interlocking with a mating plug connector along an insertion direction is provided.

According to an example embodiment of the present invention, the plug connector includes a plug connector housing that is configured to accommodate at least one contact element, in particular a plurality of contact elements. The plug connector also includes a lever assembly that is swivelable between a first position and a second position. The plug connector also includes a cover. The plug connector also includes a so-called connector position assurance (CPA) that includes at least one blocking element; the CPA may also be referred to as a contact position assurance element. In the second position the lever assembly is releasably latched to a latching structure. The CPA is situated at the cover. The CPA is displaceable between an unblocking position and a blocking position along a displacement direction, the CPA including a locking element which in the blocking position of the CPA prevents a displacement of the latching structure for releasing the latch between the lever assembly and the latching structure. The blocking element and the cover are designed to cooperate with one another in such a way that a displacement of the CPA from the unblocking position into the blocking position is a function of a position of the lever assembly. In the first position of the lever assembly the CPA is not movable from the unblocking position into the blocking position, the lever assembly including an unlocking element, in the second position of the lever assembly the unlocking element moving the blocking element so that the CPA is movable into the blocking position.

The blocking element may be moved or deflected, for example transversely or perpendicularly with respect to the displacement direction, by the unlocking element. The blocking element is elastically reversibly deflectable, for example.

This may yield the advantage that reaching the second position of the lever assembly may be recognized by haptic feedback. This is because the CPA is then displaceable (for example, movable, rotatable, swivelable, etc.) from the unblocking position into the blocking position. At the same time, in the blocking position the CPA protects the latching structure from an inadvertent actuation, and thus prevents the plug connection from unintentionally coming loose. In addition, it is advantageously ensured that the CPA cannot be inadvertently moved into the blocking position in the unconnected state of the plug connector (lever assembly in the first position). It may be provided that the CPA may be moved into the blocking position only when the lever assembly has approximately or completely reached the second position, for example after at least 90% or after at least 95% of the path from the first position into the second position. As a result, the installer is advantageously not provided with an incorrect haptic signal when he/she haptically checks the position of the CPA under poor visibility conditions, for example. A modular design is advantageously possible via the arrangement of the CPA at the cover. This is because the same CPA may be used for different shapes or types of covers, provided that the arrangement at the cover and the displacement path from the unblocking position into the blocking position are ensured. In addition, depending on the intended purpose (for example, safety-critical plug connectors versus nonsafety-critical plug connectors), the CPA may thus be easily and advantageously dispensed with, so that costs may be saved. This is advantageously possible due to the fact that the haptic recognition of whether the plug connection is closed is not directly a function of the relative position of the plug connector housing with respect to the mating plug connector, but, rather, an indirect indicator, namely, the position of the lever assembly, is used; this is advantageously effectuated with the aid of the unlocking element of the lever assembly and the blocking structure of the CPA. The CPA situated at the cover may thus be dispensed with without problems, for example for nonsafety-critical applications, without the plug connector housing then having to be modified.

In the context of the present patent application, the term "include" is basically to be understood as synonymous with the term "encompass."

A releasable latch is understood to mean that the lever assembly may be nondestructively released from the latch by manipulation or handling of the latching element, for example.

The cover may be situated at the plug connector housing, for example. It may be situated at the plug connector housing with the aid of a clip connection, for example, or may be detachably fastened. The cover may protect the contact element or the contact elements from dust and dirt, for example. It may be used, for example, as a cable guide for a line that is fastened to the contact element, or for lines that are fastened (for example, crimped) to the contact elements.

The first position of the lever assembly may be an open or unlocked position, for example. In this position, it is possible, for example, for the plug connection between the plug connector and the mating plug connector to not be closed, or for the plug connector and the mating plug connector to not be interlocked.

The second position may be a closed or locked position, for example. In this position, for example the plug connection may be closed, so that the contact elements are electrically contacted with countercontact elements of the mating plug connector. The plug connector and the mating plug connector may be interlocked in an end position.

The lever assembly may be configured, for example, to reduce an operating force when joining and/or separating the plug connector to/from the mating plug connector. The lever assembly may, for example, be rotatably supported at the plug connector housing and/or at the cover.

The CPA is suited or configured for ensuring the contact position of the plug connector at the mating plug connector.

A single contact element or a plurality of contact elements may be situated in the interior of the plug connector housing.

In the following discussion, a plurality of contact elements is always assumed, although cases in which only a single contact element is present are also always encompassed. This also analogously applies for the mating plug connector and the single countercontact element or plurality of countercontact elements.

The contact elements may be situated in contact chambers, for example, the contact chambers being formed in the interior of the plug connector housing or situated there. The contact elements may be connected to lines, for example. The contact elements may be designed, for example, as socket contacts or as female contacts. The countercontact elements of the mating plug connector may be male contacts, for example pins or contact blades. In principle, the contact elements may also be male contacts and the countercontact elements may be female contacts.

According to an example embodiment of the present invention, the CPA may be situated so that it is displaceable along the cover. The CPA may be situated, for example, at a side of the cover facing away from the mating plug connector.

According to an example embodiment of the present invention, the CPA may include exactly one blocking element. A particularly simple and cost-effectively designed CPA is thus advantageously providable.

However, according to an example embodiment of the present invention, the CPA may also include two or more blocking elements. If multiple blocking elements are provided, they may be situated, for example, in parallel to one another. If multiple blocking elements are provided, the blocking elements and the cover are designed, for example, to cooperate with each other in such a way that a displacement of the CPA from the unblocking position into the blocking position is a function of a position of the lever assembly. In the first position of the lever assembly, the CPA is not displaceable from the unblocking position into the blocking position. In the second position of the lever assembly, the at least one unlocking element moves the blocking elements, so that the CPA is displaceable into the blocking position. Due to multiple blocking elements, redundancy is advantageously provided in the event that one of the blocking elements fails or is damaged.

According to an example embodiment of the present invention, exactly one unlocking element may be situated at the lever assembly. However, this may also involve at least one unlocking element. For example, one unlocking element is provided for each blocking element of the CPA.

The latching structure may be provided at the cover, for example. The latching structure may be designed, for example, as a type of pushbutton that is elastically reversibly displaceable toward the cover or radially outwardly (for example, transversely with respect to the insertion direction), for example transversely with respect to the displacement direction of the CPA. A particularly simple and easily operable latching structure is thus advantageously providable.

According to an example embodiment of the present invention, the latching structure may be provided, for example, at a distance from the cover. It may be provided, for example, that the cover includes an opening that is situated opposite from the latching structure. The latching structure may then be pushed through this opening to release the latch. In this case, "at a distance" may be understood to mean, for example, a distance between a side of the latching structure facing the opening and a surface that is pulled through the edge of the opening. If an opening is provided, the opening may also extend only partially beneath the surface of the latching structure. It may be provided, for example, that the latch may be released by moving the latching structure in the direction of the cover. It may be provided, for example, that in the blocking position of the CPA, the blocking element of the CPA is situated between the cover (or the opening in the cover) and the latching structure. In this way, it is advantageously no longer possible for the latching structure to be moved in the direction of the cover or of the opening, provided that the blocking element is moved between the latching structure and the cover. A latch of the lever assembly may thus be advantageously ensured, using simple means.

At its side facing the cover, for example, the CPA may include a first guide element that extends along the displacement direction. At its side facing the CPA, for example, the cover may include a second guide element. It may be provided, for example, that the first and second guide elements are coupled to one another. Secure and reliable displacement of the CPA is thus advantageously ensured. The risk of tilting when the CPA is actuated is advantageously reduced. Furthermore, in a type of key-lock principle (poka-yoke) it is advantageously ensured that an incorrect CPA is not installed.

The first guide element may be designed as a groove, for example, and the second guide element may be designed as a bar that protrudes from the cover toward the CPA. Alternatively, for example the first guide element may be a bar that protrudes toward the cover, and the second guide element may be a groove. A particularly simple, secure, cost-effective, and reliable design of the guide elements is thus advantageously possible. It is understood that other specific embodiments for the guide elements are also possible, for example links, guide surfaces, journals, balls of a ball bearing, etc.

It is understood that the function of the CPA may also include a function for releasing the lever assembly from the first position. The CPA prevents a movement of the lever assembly from the first position into the second position if the plug connector is not mounted or placed in a correct or defined position on the mating plug connector. In the context of the present patent application, this functionality may in principle also be met by the described CPA, but may also be achieved at the plug connector or the plug connector assembly, for example at the housing of the plug connector, by use of a functional element that is separate from the CPA described here.

It may also be provided, for example, that electrical contacting of contact elements and countercontact elements does not take place unless the lever assembly is in the second position.

In one refinement of the present invention, it is provided that the blocking element is elastically reversibly deflectable transversely with respect to the displacement direction and includes a blocking structure, a counterstructure being formed at the cover which cooperates with the blocking structure and blocks a displacement of the CPA into the blocking position when the CPA is in the unblocking position, and the CPA (in particular at the same time) is displaced in the direction of the blocking position, and the blocking element (in particular at the same time) is not deflected, in the event of a deflection of the blocking element transversely with respect to the displacement direction, the blocking structure and the counterstructure no longer cooperating and a displacement of the CPA into the blocking position being possible.

The displacement of the CPA is thus advantageously blocked or released, using simple means.

The elastically reversible design of the blocking element is not an essential feature of the present invention. Other specific embodiments of the blocking element, for example electrically actuated or magnetically acting blockages or enabling of the CPA displacement, are also possible in principle. However, such designs may require greater effort, for example in the form of cabling.

The cooperation of the blocking structure and the counterstructure may take place in a form-fit manner, for example. When the blocking structure and the counterstructure no longer cooperate, this may be due to their becoming disengaged, for example. For example, a detent lug may have then been moved out of engagement with an undercut.

In one refinement of the present invention, it is provided that the counterstructure includes a first surface that faces the CPA, and has a first surface normal that extends essentially along the displacement direction, the first surface, starting from a base, protruding into the displacement path of the blocking structure when the blocking element is not deflected, the blocking structure including a second surface having a second surface normal, the second surface normal being tilted away from the base, viewed along the displacement direction, by a first angle with respect to the first surface normal.

This yields the advantage that when the CPA is displaced in the direction of the blocking position when the lever assembly or lever element is not yet in the second position, the blocking structure becomes engaged with the counterstructure and a further movement of the CPA is blocked. In this case, for example, the first surface and the second surface come into contact with one another. They may cooperate in a form-fit manner, for example. Due to the tilting of the two surface normals relative to one another, with increasing force in the displacement direction the blocking structure is moved in the direction of the base, and the overlap of the first and second surfaces thus increases.

In other words: due to the tilting of the surface normals relative to one another, a type of run-on slope is created which displaces the blocking element transversely with respect to the displacement direction upon striking against the counterstructure, in particular in the direction that is opposite the direction necessary for unlocking (disengaging). A type of self-securing is thus advantageously effectuated.

The first angle may be in a range between 2° and 15°, for example.

It is understood that the tilting applies for a state in which the blocking structure and the counterstructure are force-free relative to one another, i.e., at most, rest loosely against one another. In the state in which the two structures are pressed together, the tilting specifically causes the blocking structure to be displaced in the direction of the counterstructure, thus facilitating self-locking.

In the context of the present patent application, the orientation of the surface normal is regarded, for example, as always being in the displacement direction, even if mutually facing surfaces thus have approximately the same direction of the surface normals.

"Essentially along the displacement direction" also encompasses deviations of +/−10° from the displacement direction.

In one refinement of the present invention, it is provided that the unlocking element is designed as a journal which protrudes from the lever assembly, and which in the second position of the lever assembly deflects the blocking element transversely with respect to the displacement direction.

A particularly easily and cost-effectively manufacturable unlocking element is thus provided. In addition, a type of poka-yoke approach may advantageously be provided in this way. This is because only the correct lever will include the unlocking element, and thus the journal, at the correct location in order to unlock the blocking element of the CPA.

The unlocking element may unlock the blocking element of the CPA (i.e., deflect it, for example transversely with respect to the displacement direction), for example, when the CPA is in the unblocking position.

It is understood that other shapes or designs of the unlocking element are also possible, such as a permanent magnet, a Reed contact, etc.

As a result of the blocking element including a nose structure that protrudes transversely with respect to the displacement direction, and that protrudes into a trajectory of the unlocking element when the lever assembly moves from the first position into the second position, a particularly simple and secure option for unlocking the CPA is advantageously created.

A nose structure is understood to mean an element that protrudes from the blocking element. On its outer side, this element may have a shape, for example, that resembles a human nose. The element may approximately correspond to a triangle, for example, and the outer side may include roundings, for example.

The bridge of the nose structure particularly advantageously protrudes into the trajectory.

The nose structure may include, for example, a run-on slope (this may be the nose bridge, for example) for the unlocking element. In this way, the unlocking operation of the blocking element may advantageously be carried out in a particularly reliable manner without jerking.

In one refinement of the present invention, it is provided that the counterstructure includes a third surface that faces away from the CPA and that has a third surface normal extending at a second angle between 30° and 60° with respect to the displacement direction, the blocking structure including a fourth surface that faces the CPA (i.e., essentially opposite the displacement direction) and that has a fourth surface normal, the fourth surface normal extending essentially in parallel to the third surface normal.

For the directions of the third and fourth surface normals, once again it applies here that in the context of the present patent application, these are intended to be directed along the displacement direction (or into the hemisphere defined by this direction), even if the surfaces face one another.

On the one hand, a certain level of locking or latching of the CPA in its blocking position at the cover is advantageously effectuated; the CPA thus cannot fall out of the blocking position by itself. This blocking effect may be facilitated, for example, by an elastically reversible design of the blocking element. At the same time, due to the orientation of the third and fourth surface normals with respect to the displacement direction and relative to one another, the displacement of the CPA from the blocking position into the unblocking position is advantageously possible with reasonable effort, for example when the plug connection must be separated and for this purpose the latch of the lever assembly in the second position must be released.

The fourth surface may be configured, for example, as a run-on slope for the unlocking element of the lever assembly.

In one refinement of the present invention, it is provided that the CPA includes a central element, the blocking element being designed as an arm that protrudes from the central element, essentially along the displacement direction. The arm may, for example, be elastically reversibly deflectable transversely with respect to the displacement direction.

A particularly simple and cost-effectively manufacturable CPA may thus be provided.

The arm, for example in the area of its free end, may include a nose structure that protrudes transversely with respect to the displacement direction and that protrudes into a trajectory of the unlocking element when the lever assembly moves from the first position into the second position. The nose structure may, for example, include a run-on slope for the unlocking element.

According to a second aspect of the present invention, a plug connector assembly is provided.

According to an example embodiment of the present invention, the plug connector assembly includes a plug connector as described above. The plug connector assembly also includes a mating plug connector with a mating plug connector housing that is configured to accommodate at least one countercontact element, in particular a plurality of countercontact elements.

A plug connector assembly is thus advantageously provided which, even under difficult installation situations, provides an installer with reliable (haptic) feedback concerning whether, or when, the plug connection is closed. In addition, an inadvertent release of the latch of the lever assembly in the second position is advantageously prevented. Lastly, this yields the advantage that the CPA cannot be unintentionally moved prematurely into the blocking position.

The CPA may be displaceable and/or rotatable and/or swivelable, for example, to effectuate the displacement from the unblocking position into the blocking position or from the blocking position into the unblocking position.

The mating plug connector may be situated, for example, at a control unit for a motor vehicle.

BRIEF DESCRIPTION OF THE DRAWINGS

Further features and advantages of the present invention will become apparent to those skilled in the art from the following description of exemplary specific embodiments, which, however, are not to be construed as limiting to the present invention, with reference to the figures.

DETAILED DESCRIPTION OF EXAMPLE EMBODIMENTS

Figure 1A:
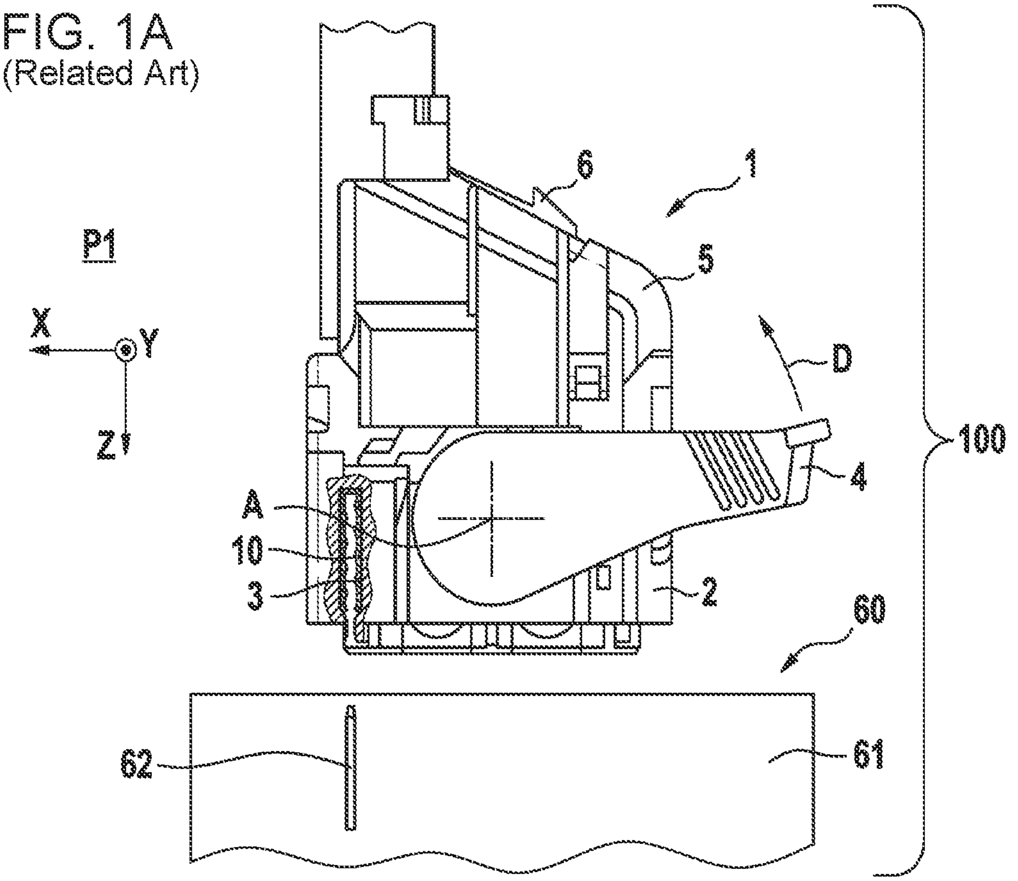
FIG. 1A (Related Art)
FIGS. 1A and 1B show schematic illustrations of a plug connector assembly from the related art.
Figure 1B:
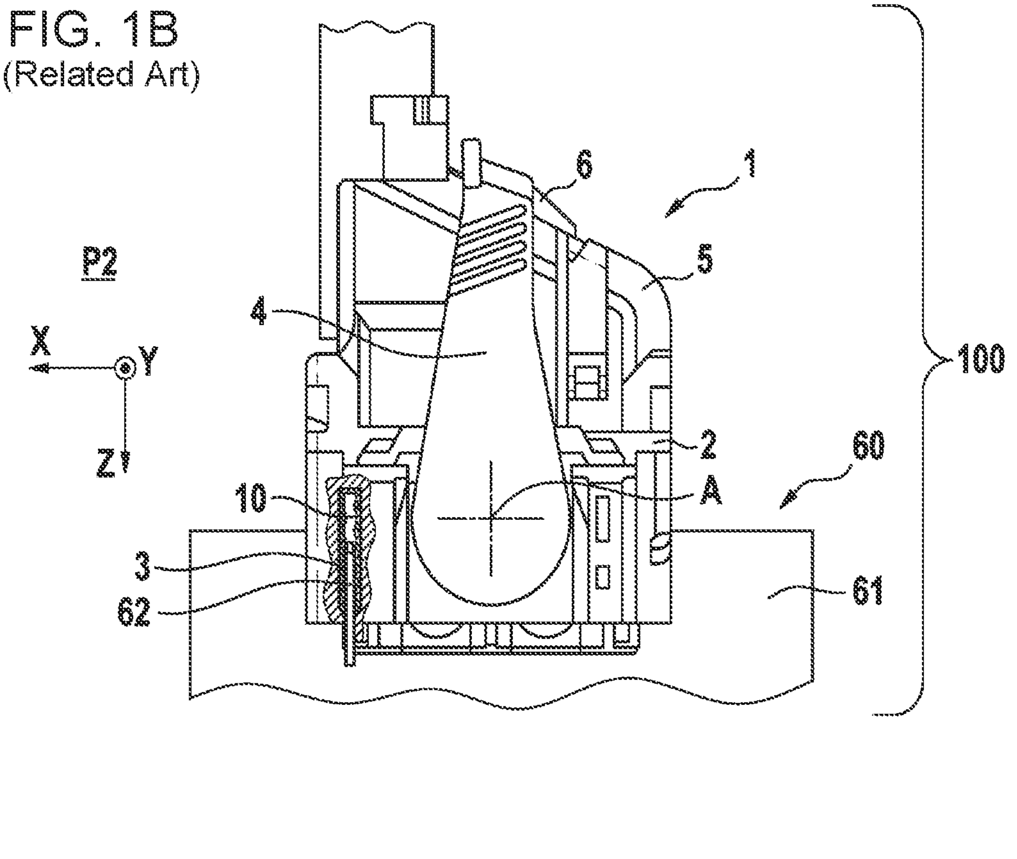
FIG. 1B (Related Art)

FIGS. 1A and 1B show a schematic illustration of a plug connector assembly 100 from the related art in an unconnected state (FIG. 1A) and in a connected state (FIG. 1B). Plug connector assembly 100 includes a plug connector 1 with a plug connector housing 2, and a mating plug connector 60 with a mating plug connector housing 61. Plug connector 1 is suited or configured for interlocking with mating plug connector 60 along an insertion direction Z.

Mating plug connector housing 61 is configured to accommodate a plurality of countercontact elements 62, in the present case designed as pins or contact blades; only a single countercontact element 62 is illustrated here for reasons of clarity.

Plug connector housing 2 is configured to accommodate a plurality of contact elements 3, which in the present case are designed as socket contact elements, for example, and situated in contact chambers 10 in the interior of plug connector housing 2.

Plug connector 1 also includes a cover 5 at the side of plug connector housing 2 facing away from mating plug connector 60.

Plug connector 1 also includes a lever assembly 4 for reducing operating forces that occur during the plugging operation, lever assembly 4 being swivelable between a first position P1 (FIG. 1A) and a second position P2 (FIG. 1B). The swiveling from first position P1 into second position P2 takes place about an axis A, and defines a rotational direction D. First position P1 may also be referred to as an open position or unlocked position. Second position P2 may also be referred to as a closed position or locked position; in second position P2, lever assembly 4 is releasably latched to a latching structure 6 designed as a detent lug.

For better orientation, a Cartesian coordinate system is indicated, insertion direction Z being perpendicular to a direction Y, which in the present case corresponds to the direction of axis A. A longitudinal direction of plug connector housing 2 extends here along a direction X that extends perpendicularly with respect to the Y direction and also with respect to insertion direction Z.

Figure 2:
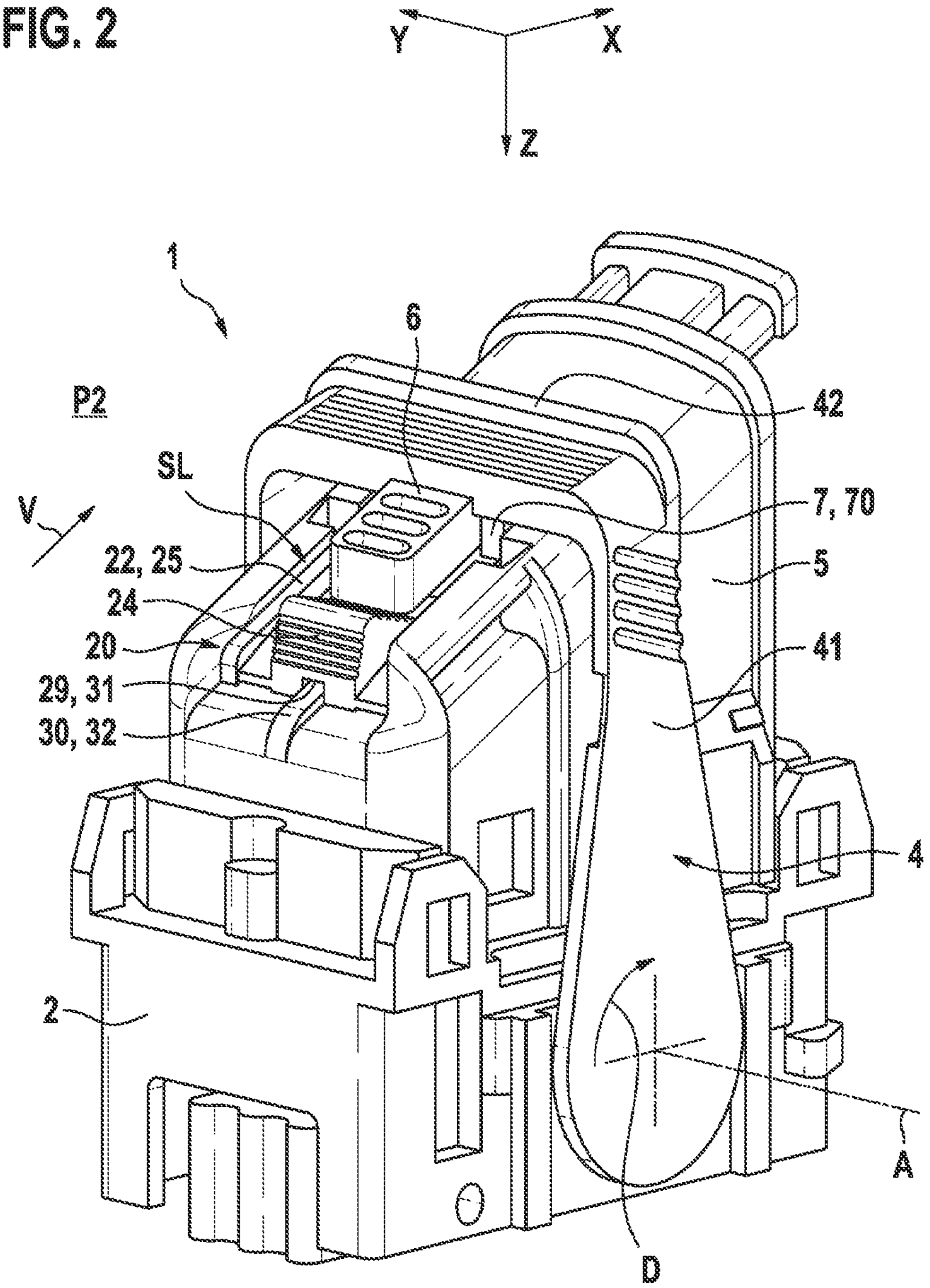
FIG. 2 shows a schematic perspective illustration of a plug connector of a plug connector assembly, according to an example embodiment of the present invention.

FIG. 2 shows a schematic perspective illustration of a plug connector 1 of a plug connector assembly 100, details of plug connector 1 being described below, also with reference to FIGS. 3A through 5B.

Figure 3B:
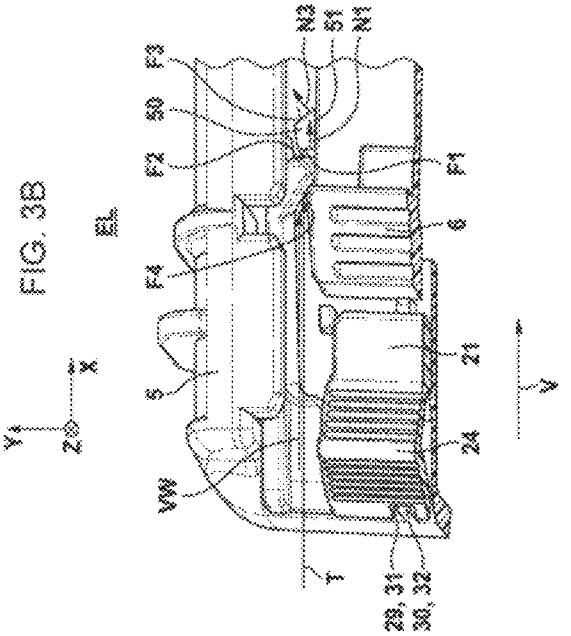
FIGS. 3A through 4B show various illustrations of a CPA and a cover of the plug connector from FIG. 2.
Figure 3A:
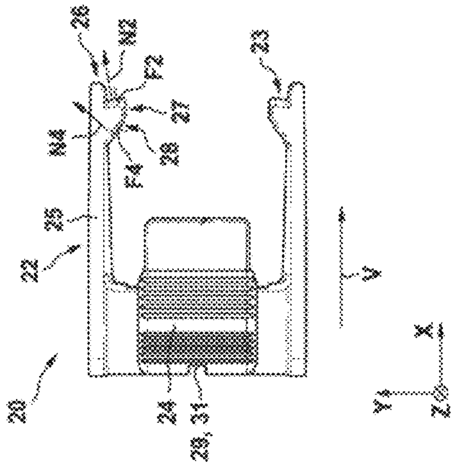

FIG. 2 shows that plug connector 1 illustrated here, in contrast to plug connector 1 from FIGS. 1A and 1B, includes a CPA 20 with at least one blocking element 22 (cf. FIG. 3A, for example). Blocking element 22, strictly by way of example, may be designed as an arm 25, and may be situated, for example, at a central element 24. The central element may extend, for example, transversely with respect to the direction of extension of blocking element 22. In the installed state of plug connector 1, CPA 20 is situated at cover 5 and is displaceable (in the present case, slidable) between an unblocking position EL and a blocking position SL along a displacement direction V. CPA 20 includes a blocking element 21 (cf. FIG. 3A, for example) which in blocking position SL of CPA 20 prevents a displacement of latching structure 6 for releasing the latch between lever assembly 4 and latching structure 6, and in the present case thus prevents a displacement of latching structure 6 in the direction of cover 5. Blocking element 22 and cover 5 are designed to cooperate with one another in such a way that a displacement of CPA 20 from unblocking position EL into blocking position SL (from left to right in FIG. 3B, for example) is a function of a position of lever assembly 4 (cf. FIGS. 8A through 9C in this regard). In first position P1 of lever assembly 4, CPA 20 cannot be moved from unblocking position EL into blocking position SL. Lever assembly 4 (FIGS. 2, 5A, 5B) includes an unlocking element 7 which in the present case is designed as a journal 70 or pin, etc., in second position P2 of lever assembly 4, unlocking element 7 displacing blocking element 22, in particular transversely with respect to displacement direction V (in the present case, radially outwardly, viewed from the center of cover 5), so that CPA 20 is displaceable into blocking position SL. This radially outward displacement corresponds here to a displacement on the Y axis. However, a displacement along or opposite insertion direction Z may also be provided.

At its side facing cover 5, CPA 20 includes, as an example here, a first guide element 29 that extends along displacement direction V. At its side facing CPA 20, cover 5 includes, as an example here, a second guide element 30, with first and second guide elements 29, 30 being coupled to one another. In this exemplary embodiment, first guide element 29, strictly by way of example, includes a groove 31, and the second guide element includes a bar 32 that protrudes from cover 5 toward CPA 20.

Cover 5 here is fastened to plug connector housing 2 by clip connections, for example. The cover may also be manufactured as an injection-molded part, for example. It may, for example, be made of plastic or may contain plastic.

FIG. 3A shows that CPA 20 in the present case includes two blocking elements 22 which are designed in parallel to each other here as an example. Each blocking element 22 is designed to cooperate with cover 5 in such a way that a displacement of CPA 20 from unblocking position EL into blocking position SL is a function of a position of lever assembly 4 (cf. FIGS. 8A through 9C in this regard).

Each blocking element 22 is elastically reversibly deflectable transversely with respect to displacement direction V, and includes a blocking structure 23. Counterstructures 50 that cooperate with blocking structures 23, in the present case in a form-fit manner strictly by way of example, and that block a displacement of CPA 20 into blocking position SL are provided at cover 5. This blockage occurs when CPA 20 is in unblocking position EL and CPA 20 is moved in the direction of blocking position SL and blocking elements 22 are not deflected (in the present case, not deflected radially outwardly).

During a deflection of blocking elements 22 transversely with respect to displacement direction V (in the present case, radially outwardly), blocking structure 23 and counterstructure 50 no longer cooperate (cf. FIG. 9C, for example) and then become disengaged, and a displacement of CPA 20 into blocking position SL is made possible.

The geometric design and the cooperation of blocking structures 23 and respective counterstructures 50, illustrated here as an example, are also discussed below by way of example with reference to FIGS. 3A, 3B, 6A, and 6B. The description is limited to a single pair made up of blocking structure 23 and counterstructure 50.

Figure 6B:
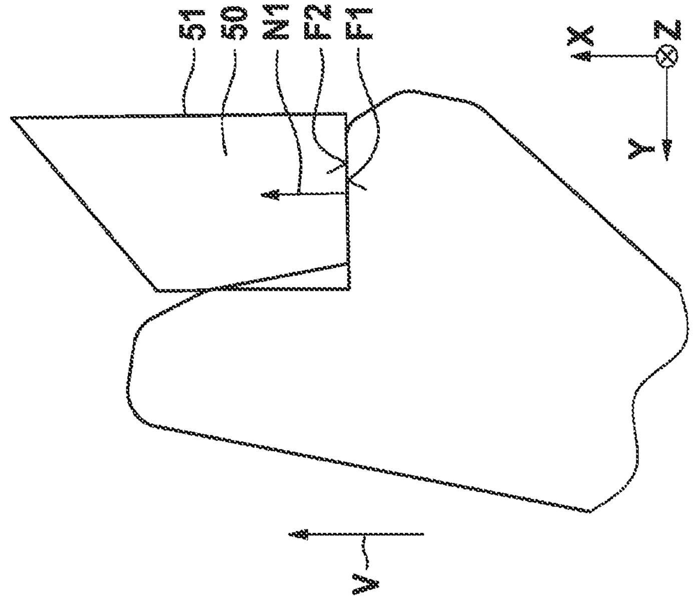
FIGS. 6A and 6B show an enlarged view of the blocking structure of the CPA and the counterstructure at the cover, prior to cooperation and during cooperation in the unblocking position of the CPA.
Figure 6A:
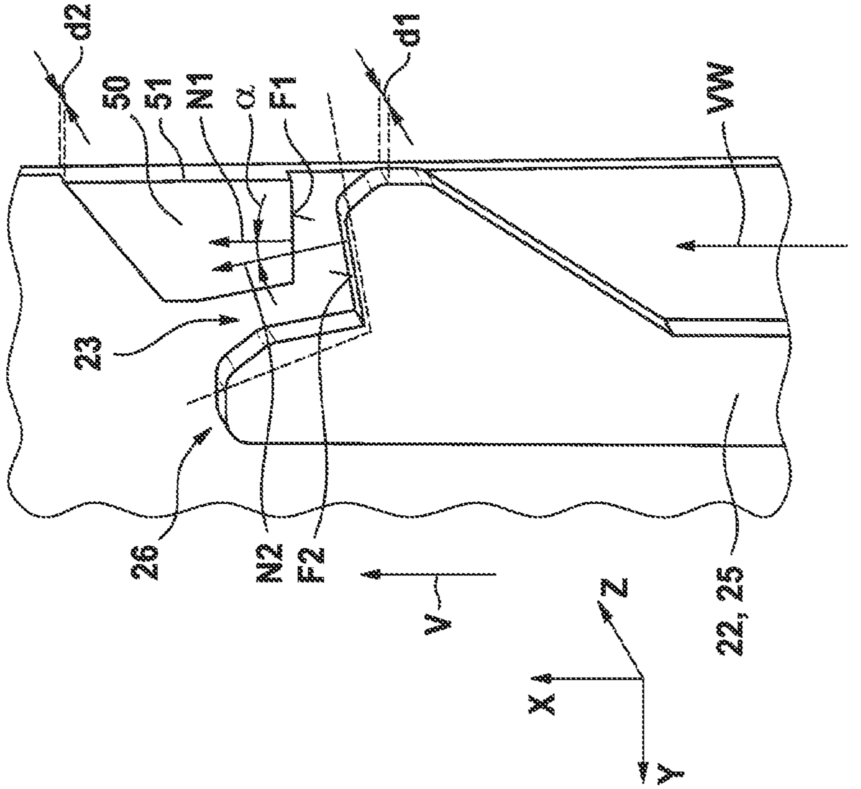
Figure 7B:
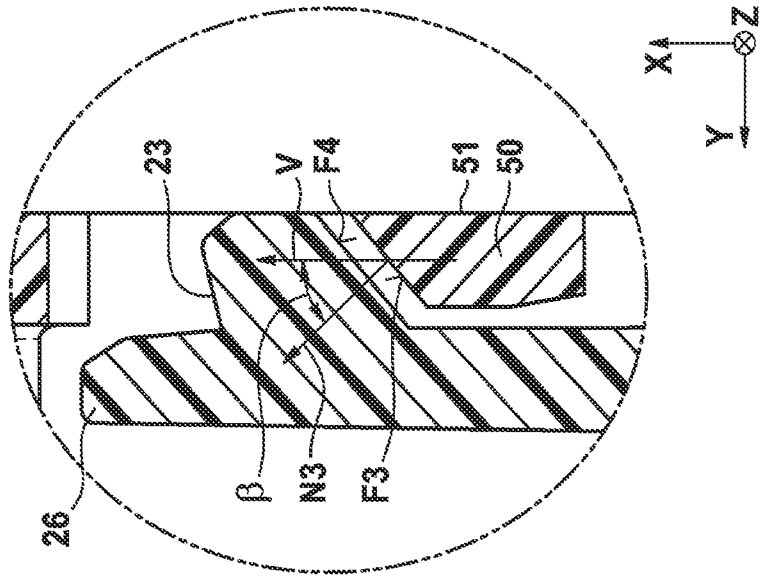
FIG. 7B shows an enlarged illustration of the blocking structure and the counterstructure from FIG. 7A, according to an example embodiment of the present invention.
Figure 7A:
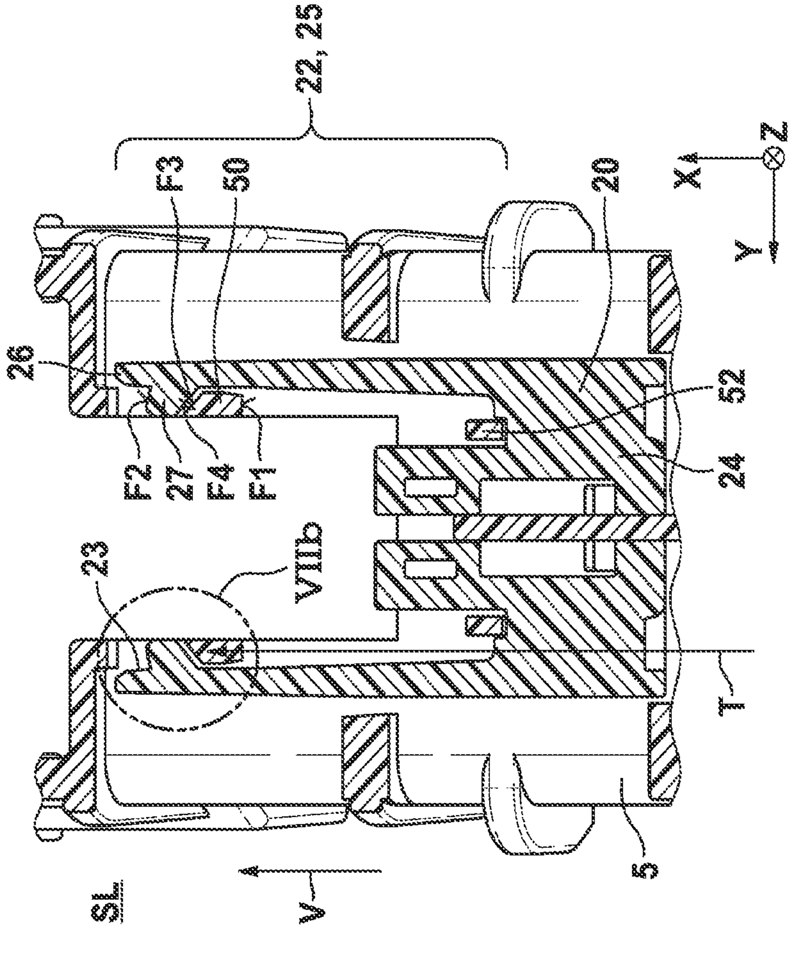
FIG. 7A shows a top view onto the cover and the CPA in the blocking position, according to an example embodiment of the present invention.

FIGS. 3B and 6A show that counterstructure 50 includes a first surface F1 that faces CPA 20 and that has a first surface normal N1 that extends essentially along displacement direction V. As described above, the direction of the surface normals is always indicated here along displacement direction V whenever possible. First surface F1, starting from a base 51, protrudes into displacement path VW (cf. also FIG. 6A) of blocking structure 23 when blocking element 22 is not deflected.

FIGS. 3A and 6A show that blocking structure 23 includes a second surface F2 having a second surface normal N2, second surface normal N2 being tilted away from base 51, viewed along displacement direction V, by a first angle $\alpha$ with respect to first surface normal N1. First angle $\alpha$ may be in a range between 2° and 15°, for example.

FIGS. 6A and 6B show the effect of the tilting of the two surface normals N1, N2 relative to one another. As long as first surface F1 is not yet in full contact with second surface F2, upon the first mechanical contact of the two surfaces F1, F2 with each other, the tilting acts as a run-on slope or run-up slope. Due to the direction of the tilting (first angle α), blocking element 22 is pushed in the direction of base 51 (in the present case, radially inwardly), and thus opposite to the unlocking direction (in the present case, radially outwardly). This prevents blocking elements 22 from "snapping" radially outwardly and CPA 20 being moved into blocking position SL due to an increasing pressure on CPA 20 along displacement direction V, even though lever assembly 4 is not in second position P2.

In this state acted on by force (FIG. 6B), the two surface normals N1, N2 extend in parallel.

Figure 5A:
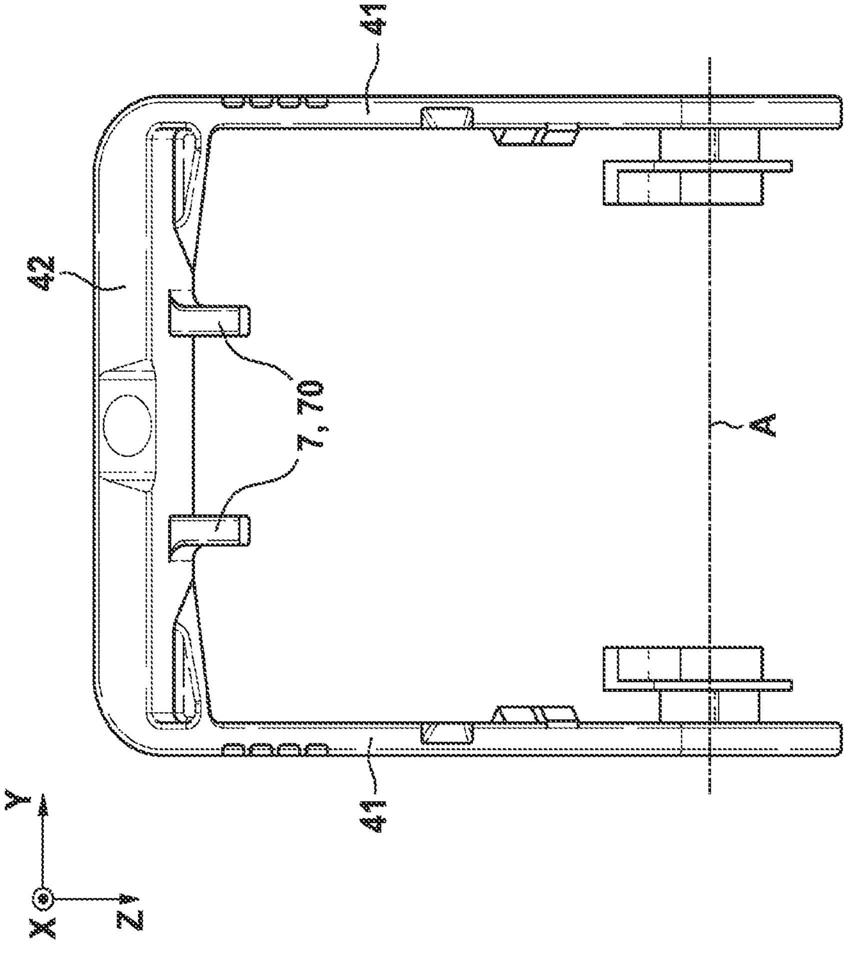
FIGS. 5A and 5B show schematic views of a lever assembly of the plug connector from FIG. 2 in different perspectives.
Figure 5B:
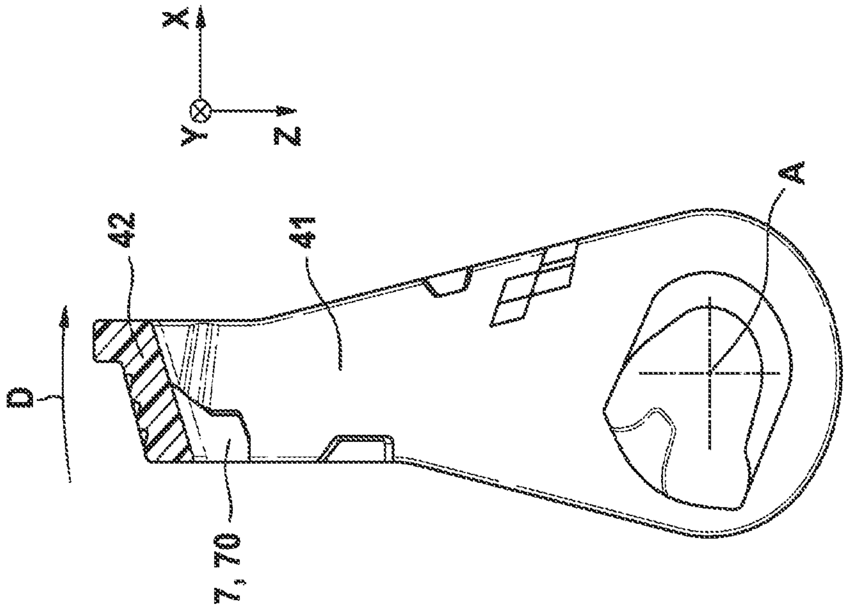

It is clearly apparent in FIGS. 5A and 5B that two unlocking elements 7 are situated at lever assembly 4, and as an example are each designed here as a journal 70 that protrudes from lever assembly 4. In second position P2 of lever assembly 4, the two unlocking elements 7, 70 deflect blocking element 22 or respectively corresponding blocking elements 22 transversely with respect to displacement direction V, in particular when CPA 20 is in unblocking position EL.

In the present case, lever assembly 4 includes two lever arms 41 and a connecting element 42 that connects the two lever arms 41. Lever assembly 4 thus has the shape of an (upside-down) U.

It is clearly apparent in FIGS. 3A, 3B, 4B, 6A, 6B, 7A, and 7B that blocking element 22 includes a nose structure 27 that protrudes transversely with respect to displacement direction V, and which protrudes into trajectory T of unlocking element 7 when lever assembly 4 moves from first position P1 into second position P2. To allow the radially outward deflection of blocking element 22 to take place easily, smoothly, and without jerking, in the present case nose structure 27 includes by way of example a run-on slope 28 for unlocking element 7, this run-on slope corresponding, as an example, to the nose bridge of nose structure 27.

Counterstructure 50 in the present case includes a third surface F3 by way of example which faces away from CPA 20 and has a third surface normal N3. Third surface normal N3 extends, for example, at a second angle β between 30° and 60° with respect to displacement direction V. Blocking structure 23 includes a fourth surface F4 that faces CPA 20 (i.e., points into a hemisphere opposite the insertion direction) and has a fourth surface normal N4, fourth surface normal N4 extending essentially in parallel to third surface normal N3. Fourth surface F4 may be configured as a run-on slope 28 for unlocking element 7 of lever assembly 4.

CPA 20 has a first thickness d1 transverse to displacement direction V. This first thickness d1 is formed in particular at blocking element 22 or at nose structure 27. For example, first thickness d1 is formed at that structure which interacts with unlocking element 7.

The counterstructure has a second thickness d2 transverse to displacement direction V. Second thickness d2 may, for example, be smaller than first thickness d1. First thickness d1 and second thickness d2 may be designed in such a way, for example, that in second position P2 of the lever assembly, unlocking element 7 comes into (mechanical) contact with nose structure 27 or with CPA 20 and effectuates a displacement of blocking element 22. However, at the same time, unlocking element 7 may swivel across counterstructure 50, since second thickness d2 has a correspondingly small design, so that the counterstructure does not protrude into the trajectory of unlocking element 7. For example, second thickness d2 may be at most 75%, preferably at most 50%, of first thickness d1. First thickness d1 of CPA 20 or of nose structure 27 or of blocking element 22 may be in a range, for example, between 1 mm and 10 mm, for example 2 mm or 3 mm.

In the exemplary embodiment illustrated here, CPA 20 has a comb-like or fork-like design, in the present case with two tines. For this purpose, CPA 20 includes a central element 24, each blocking element 22 being designed as an arm 25 that protrudes from central element 24 essentially along displacement direction V. Each arm 25 has a free end 26. In the present case by way of example, each arm 25 is elastically reversibly deflectable transversely with respect to displacement direction V, in the present exemplary embodiment, in each case radially outwardly, viewed from the center of the cover.

In the present case, each arm 25, by way of example in the area of its free end 26 (for example, for at least 60% of the length of arm 25, but in the present case, not at the outermost end of free end 26, but instead at approximately 85% to 90% of the length of arm 25), includes nose structure 27 that protrudes transversely with respect to displacement direction V. This nose structure protrudes into trajectory T of unlocking element 7 when lever assembly 4 moves from first position P1 into second position P2. Each nose structure 27 here includes a run-on slope 28 for unlocking element 7.

Figure 4B:
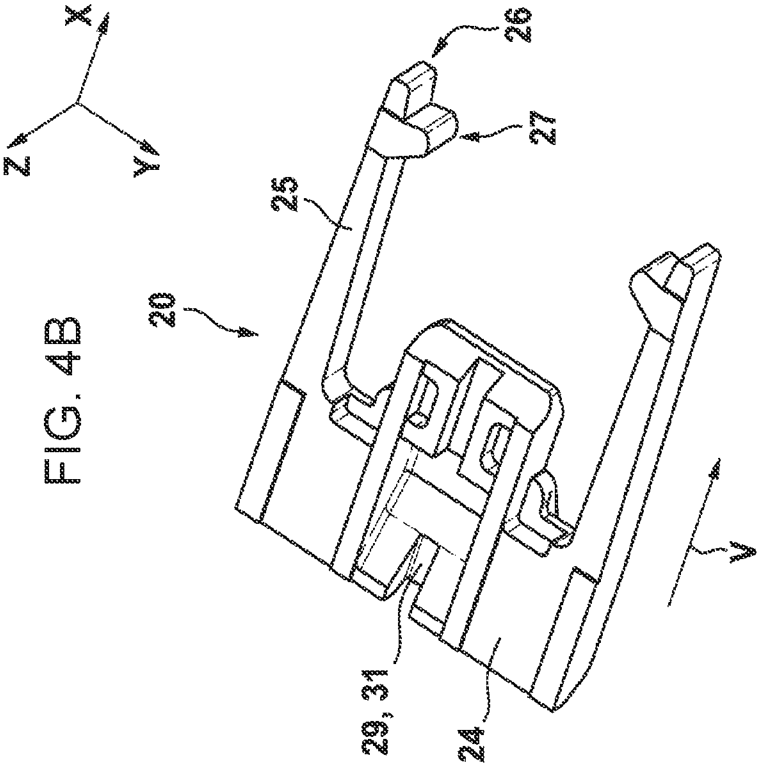
Figure 4A:
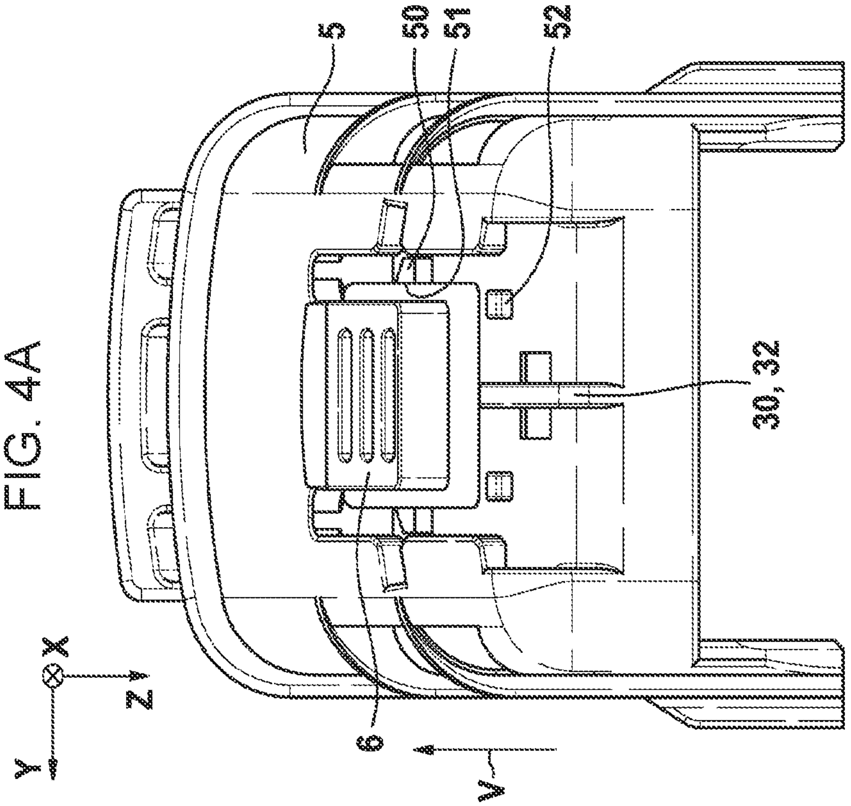

FIGS. 3B and 4A show that latching structure 6 is spaced apart from cover 5, the latch being releasable by displacing latching structure 6 in the direction of cover 5, in the present case for example approximately in the direction of insertion direction Z. It is understood that the spacing may also be designed, for example, as a distance from a bottom side of latching structure 6 to an imaginary extension of the cover surface. In blocking position SL of CPA 20, blocking element 21 of CPA 20, at least in sections, is situated between cover 5 and latching structure 6.

FIGS. 4A and 4B once again show in detail that at its side facing cover 5, CPA 20 includes a first guide element 29 that extends along displacement direction V. At its side facing CPA 20, cover 5 includes a second guide element 30, with first and second guide elements 29, 30 being coupled to one another. FIG. 4B shows a bottom side of CPA 20. In this exemplary embodiment, first guide element 29, strictly by way of example, is a groove 31 and the second guide element is a bar 32 that protrudes from cover 5 toward CPA 20. It is understood that a reverse design is also possible. In that case, first guide element 29 would be a bar protruding toward cover 5, and second guide element 30 would be a groove. Lastly, even further designs of guide elements 29, 30 are possible, such as link structures, guide surfaces, balls of a ball bearing, etc.

In addition, two stop structures 52 are provided at cover 5. These are designed as journals or pins that protrude upwardly (opposite insertion direction Z), and are provided at both sides of second guide element 30. These stop structures 52 cooperate with central element 24 of CPA 20 (they engage, viewed here along the Y direction, with the area between arms 25 and central element 24) when the CPA has been displaced into blocking position SL. The stop structures stop the displacement of CPA 20, and haptically indicate to the installer that CPA 20 is in blocking position SL.

Figure 8A:
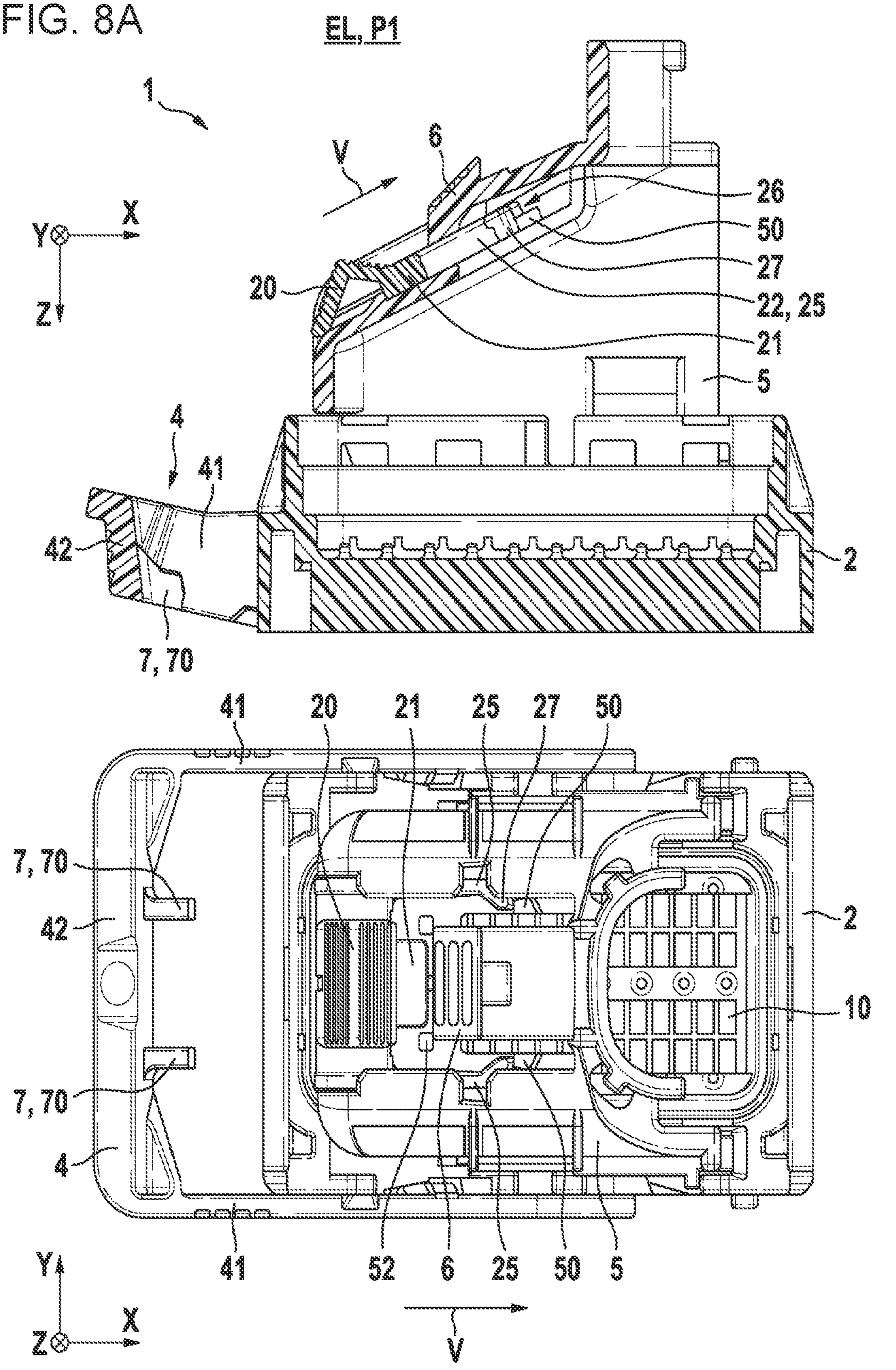
FIGS. 8A through 8C show illustrations of a plug connector during the operation of connecting the plug connector and the mating plug connector in various states, in each case as a side view and as a top view, according to an example embodiment of the present invention.
Figure 8B:
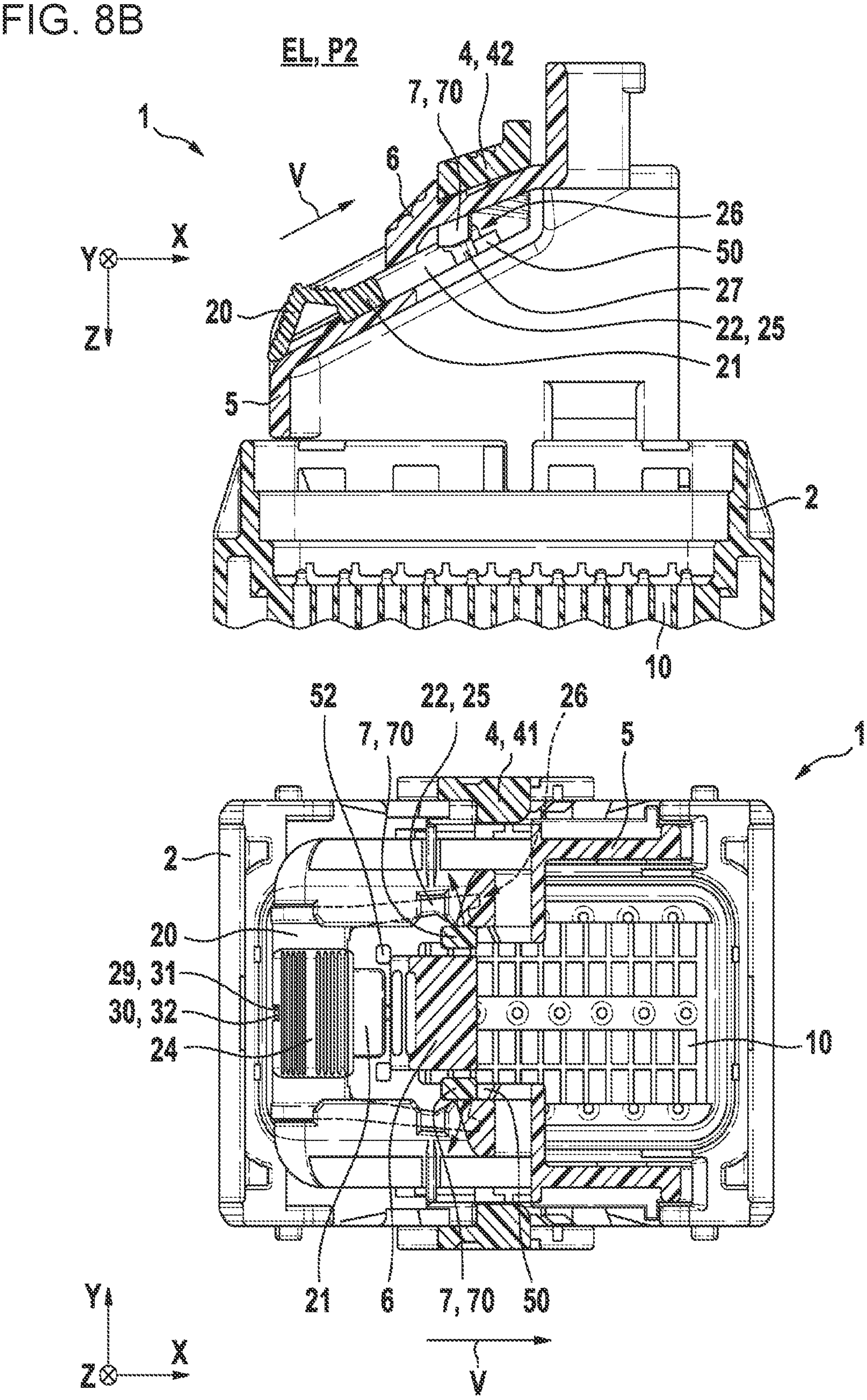
Figure 8C:
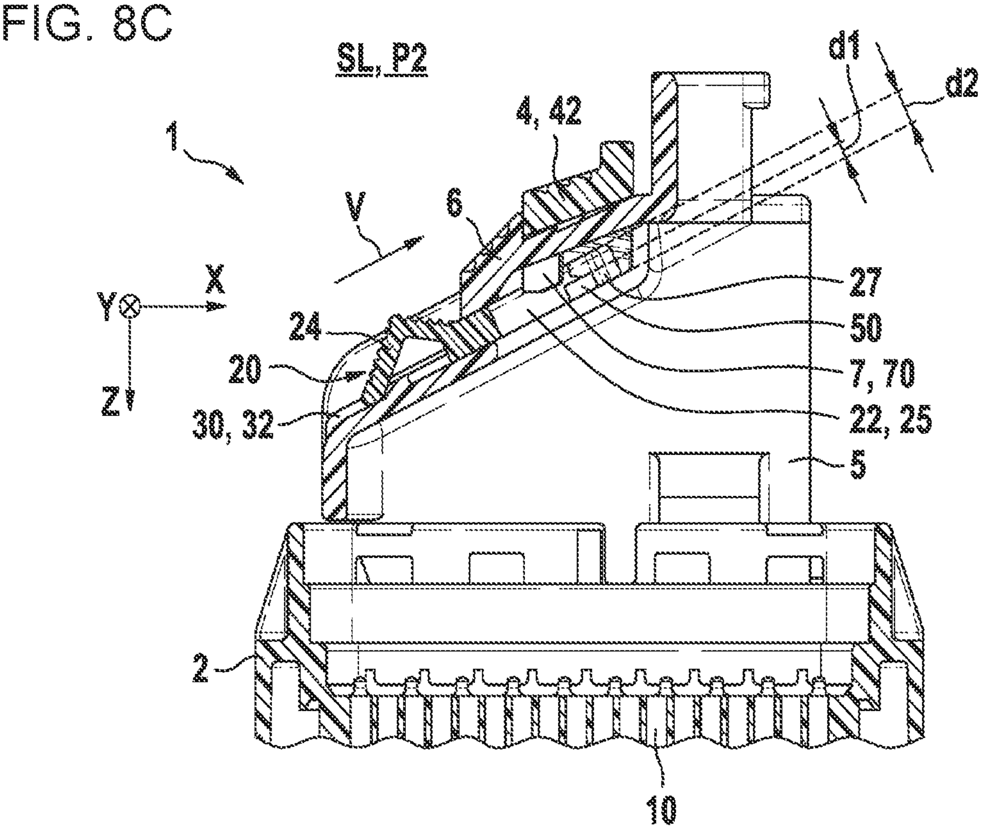
Figure 8C:
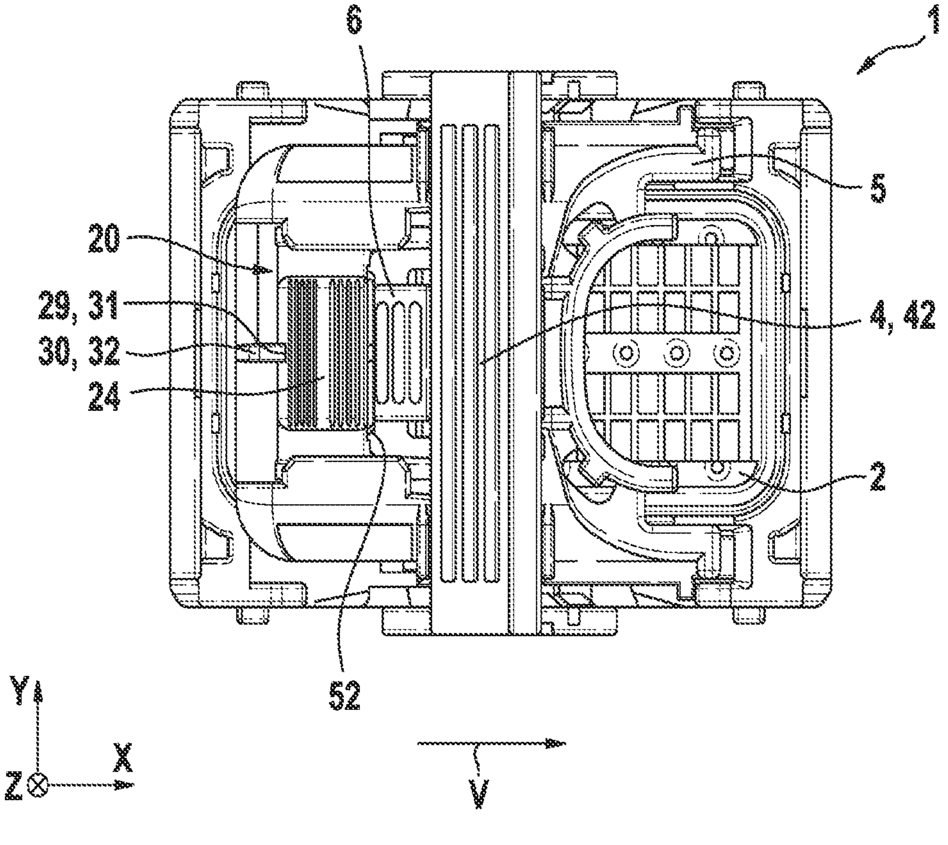

FIGS. 8A through 8C show various states during the interlocking of plug connector 1 and mating plug connector 60 to form a closed plug connection. Each subfigure illustrates a side view of plug connector 1 in the upper diagram, and a top view onto plug connector 1 in the lower diagram.

FIG. 8A shows a starting state. Plug connector 1 has, for example, just been placed on mating plug connector 60 (analogously to the situation in FIG. 1A, for example), and lever assembly 4 is in first position P1 and CPA 20 is in unblocking position EL.

FIG. 8B shows the state in which lever assembly 4 has been moved into second position P2, but CPA 20 is still in unblocking position EL. The plug connection is thus already closed (in its end position), and lever assembly 4 is already latched to latching structure 6. Unlocking elements 7, 70 of lever assembly 4 have already disengaged blocking elements 22 from counterstructures 50 (cf. the radially outwardly projecting arrows), so that CPA 20 in principle is ready to be moved into blocking position SL.

FIG. 8C shows the state in which CPA 20 has been transferred into blocking position SL by displacement along displacement direction V.

Figure 9A:
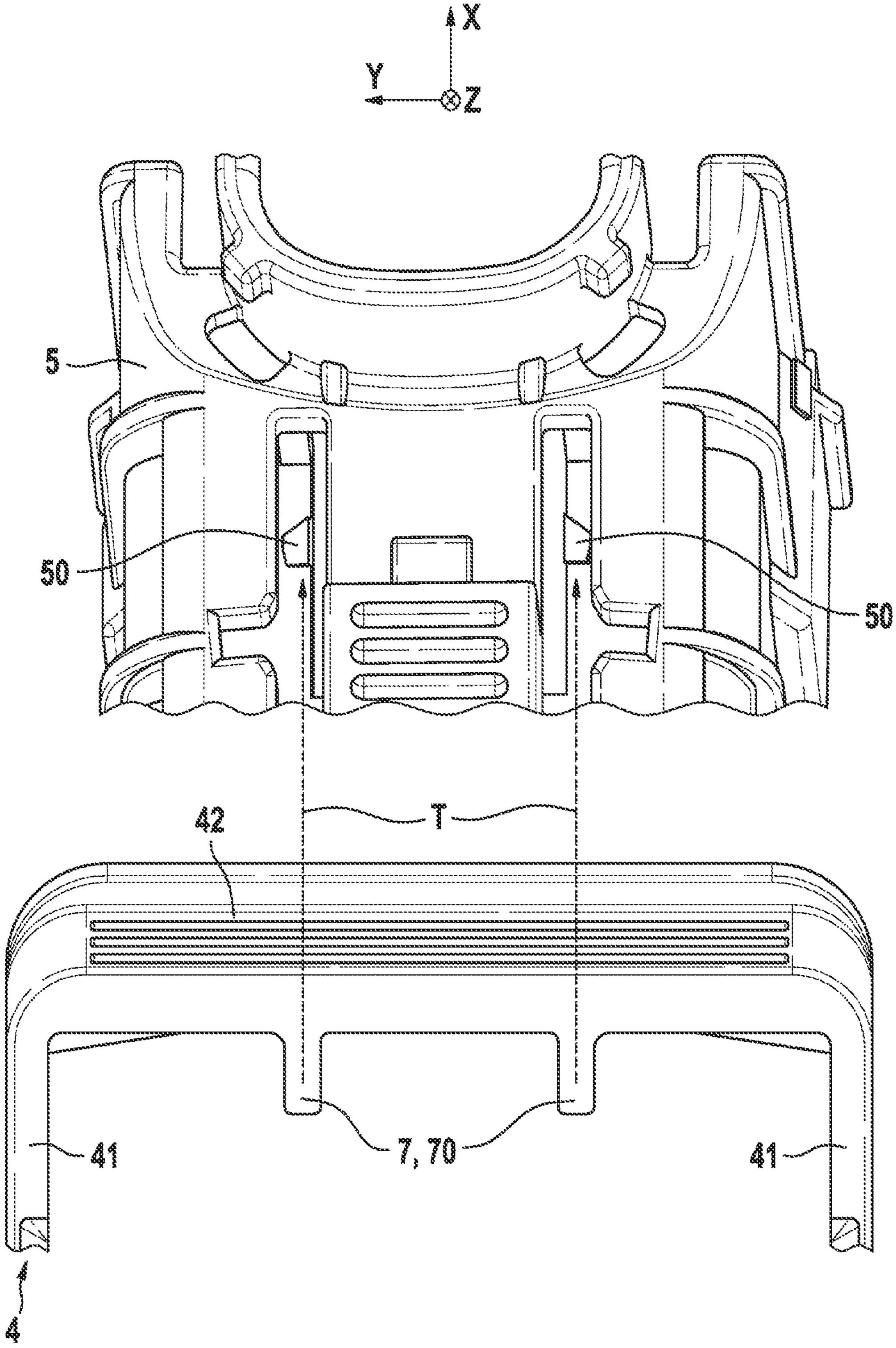
FIGS. 9A through 9C show schematic illustrations of the cooperation of the unlocking element of the lever assembly from FIGS. 8A through 8C, during unlocking of the blocking element of the CPA in the unblocking position, according to an example embodiment of the present invention.

FIG. 9A schematically shows trajectories T of unlocking elements 7, 70 of lever assembly 4 during the displacement from first position P1 to second position P2.

Figure 9B:
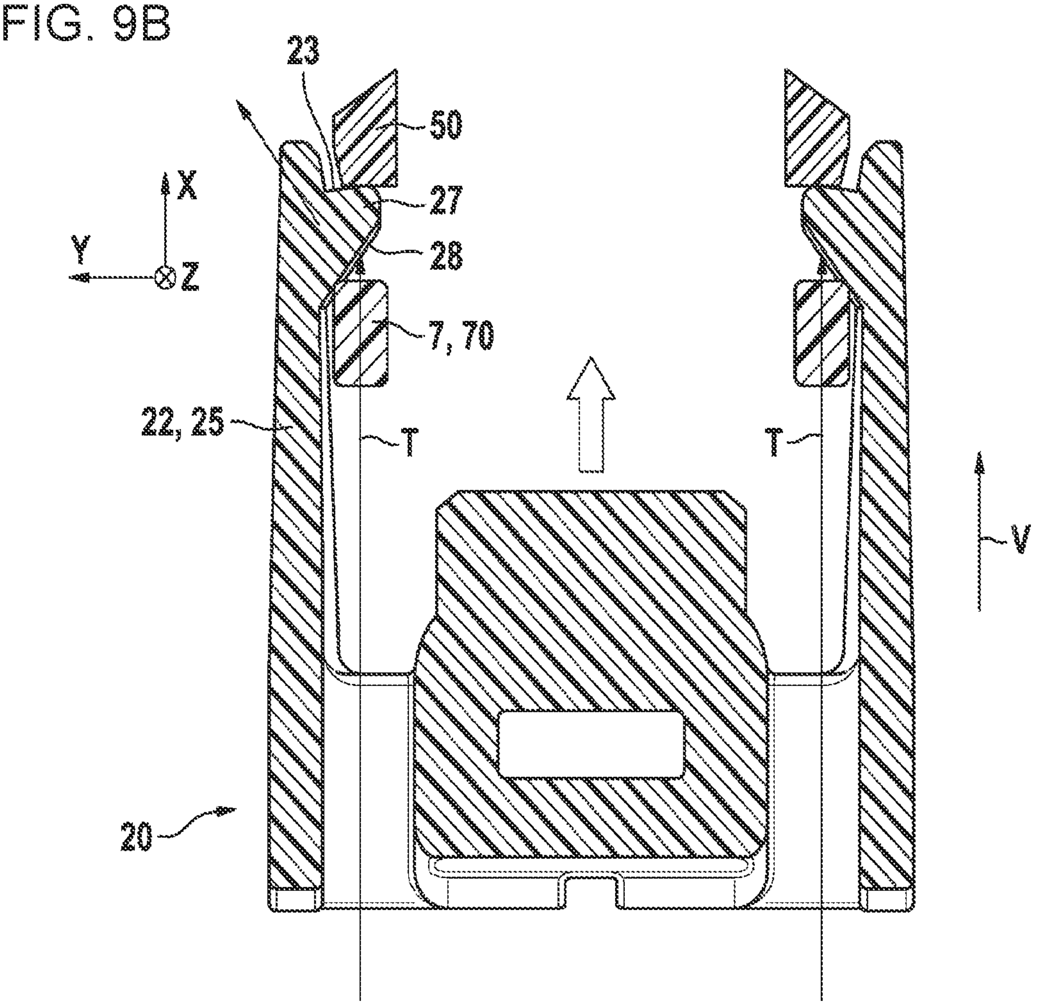

FIG. 9B shows, in a sectional view, a state shortly before lever assembly 4 reaches second position P2. Unlocking elements 7, 70 are just contacting run-on slopes 28 of nose structure 27.

Figure 9C:
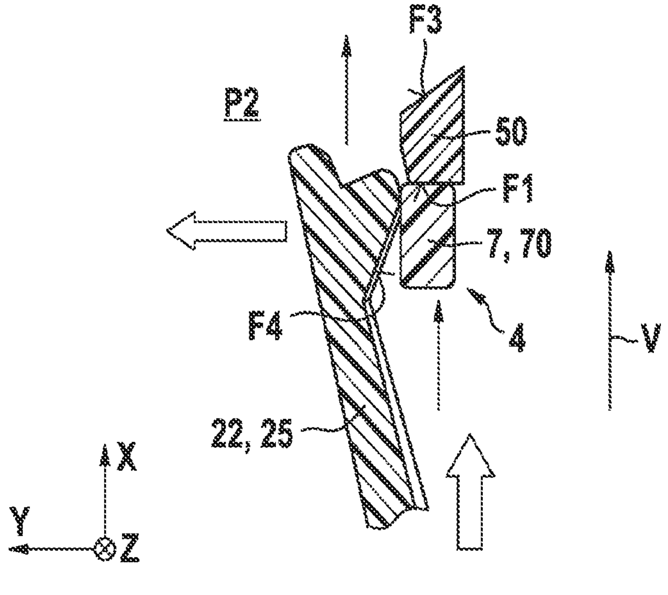

FIG. 9C shows, in a sectional view, a state in which lever assembly 4 has reached second position P2. Unlocking element 7, 70 here rests against first surface F1 of counterstructure 50. Unlocking elements 7, 70 have thereby pushed blocking element 22 or arm 25 radially outwardly (transversely with respect to displacement direction V), so that nothing now stands in the way of a displacement of CPA 20 along the displacement direction toward blocking position SL. If CPA 20 is now moved along displacement direction V, arm 25 once again elastically reversibly snaps radially inwardly after overcoming counterstructure 50, and with its fourth surface F4 then rests against third surface F3 of counterstructure 50 (FIG. 7B) (this applies for both arms 25 or blocking elements 22 of CPA 20).

In this way, the correct interlocking of plug connector 1 and mating plug connector 60 may be haptically checked in an advantageously cost-effective and simple manner, and also as a modular concept (CPA 20 may be situated at arbitrary covers 5), for example in safety-relevant or nonsafety-relevant automotive applications or, for example, in safety-relevant or nonsafety-relevant aviation applications, and latching structure 6 may be secured against unintentional unlatching. In addition, an inadvertent early, misleading displacement of CPA 20 into blocking position SL is thus advantageously prevented.

What is claimed is:

1. A plug connector for interlocking with a mating plug connector along an insertion direction, the plug connector comprising:

- a plug connector housing configured to accommodate at least one contact element;
- a lever assembly that is swivelable between a first position and a second position about an axis extending in the Y-direction;
- a cover situated at the plug connector housing;
- a connector position assurance (CPA) that includes at least one blocking element;

wherein:

- in the second position, the lever assembly being releasably latched to a latching structure,
- the CPA is situated at the cover,
- the CPA is displaceable between an unblocking position and a blocking position along a displacement direction,
- the CPA includes a blocking element which, in the blocking position of the CPA, prevents a displacement of the latching structure for releasing the latch between the lever assembly and the latching structure,
- the blocking element and the cover are configured to cooperate with each other in such a way that a displacement of the CPA from the unblocking position into the blocking position is a function of a position of the lever assembly, and
- in the first position of the lever assembly, the CPA not being movable from the unblocking position into the blocking position,
- the lever assembly includes an unlocking element,
- in the second position of the lever assembly, the unlocking element moving the blocking element radially outward transversely to the displacement direction along the axis extending in the Y-direction, so that the CPA is movable into the blocking position.

2. The plug connector as recited in claim 1, wherein:

the blocking element is elastically reversibly deflectable transversely with respect to the displacement direction and includes a blocking structure, a counterstructure that cooperates with the blocking structure in a form-fit manner being provided at the cover, the counterstructure blocking a displacement of the CPA into the blocking position when

- the CPA is in the unblocking position and
- the CPA is moved in the direction of the blocking position and
- the blocking element is not deflected, during a deflection of the blocking element transversely with respect to the displacement direction, the blocking structure and the counterstructure no longer cooperating and becoming disengaged, and a displacement of the CPA into the blocking position being possible.

3. The plug connector as recited in claim 1, wherein the unlocking element is a journal which protrudes from the lever assembly, and which in the second position of the lever assembly deflects the blocking element transversely with respect to the displacement direction, when the CPA is in the unblocking position.

4. The plug connector as recited in claim 1, wherein the blocking element includes a nose structure that protrudes transversely with respect to the displacement direction, and that protrudes into a trajectory of the unlocking element when the lever assembly moves from the first position into the second position, the nose structure including in particular a run-on slope for the unlocking element.

5. The plug connector as recited in claim 1, wherein the CPA includes a central element, the blocking element being an arm that protrudes from the central element, essentially along the displacement direction, the arm being elastically reversibly deflectable transversely with respect to the displacement direction, the arm in an area of its free end including a nose structure that protrudes transversely with respect to the displacement direction and that protrudes into a trajectory of the unlocking element when the lever assembly moves from the first position into the second position, the nose structure including a run-on slope for the unlocking element.

6. The plug connector as recited in claim 1, wherein the counterstructure includes a first surface that faces the CPA, and has a first surface normal that extends essentially along the displacement direction, the first surface, starting from a base, protruding into a displacement path of the blocking structure when the blocking element is not deflected, the blocking structure including a second surface having a second surface normal, the second surface normal being tilted away from the base, viewed along the displacement direction, by a first angle with respect to the first surface normal, the first angle being in a range of between 2° and 15°.

7. The plug connector as recited in claim 6, wherein the counterstructure includes a third surface that faces away from the CPA and that has a third surface normal extending at a second angle between 30° and 60° with respect to the displacement direction, the blocking structure including a fourth surface that faces the CPA and that has a fourth surface normal, the fourth surface normal extending essentially in parallel to the third surface normal, the fourth surface being configured as a run-on slope for the unlocking element of the lever assembly.

8. A plug connector assembly, comprising:

a plug connector for interlocking with a mating plug connector along an insertion direction, the plug connector including:

a plug connector housing configured to accommodate at least one contact element, a lever assembly that is swivelable between a first position and a second position about an axis extending in the Y-direction, a cover situated at the plug connector housing;

a connector position assurance (CPA) that includes at least one blocking element, wherein:

in the second position, the lever assembly being releasably latched to a latching structure, the CPA is situated at the cover, the CPA is displaceable between an unblocking position and a blocking position along a displacement direction, the CPA includes a blocking element which, in the blocking position of the CPA, prevents a displacement of the latching structure for releasing the latch between the lever assembly and the latching structure, the blocking element and the cover are configured to cooperate with each other in such a way that a displacement of the CPA from the unblocking position into the blocking position is a function of a position of the lever assembly, and in the first position of the lever assembly, the CPA not being movable from the unblocking position into the blocking position, the lever assembly includes an unlocking element, in the second position of the lever assembly, the unlocking element moving the blocking element radially outward transversely to the displacement direction along the axis extending in the Y-direction, so that the CPA is movable into the blocking position; and the mating plug connector, the mating plug connector including a mating plug connector housing that is configured to accommodate at least one countercontact element.

* * * * *